(12) United States Patent
Harvey et al.

(10) Patent No.: US 11,799,414 B1
(45) Date of Patent: Oct. 24, 2023

(54) PASSIVELY DEPLOYABLE SOLAR PANEL ARRAY WITH TRUSS BACKING

(71) Applicant: Southwest Research Institute, San Antonio, TX (US)

(72) Inventors: Toby J. Harvey, Enoch, UT (US); Thomas J. Harvey, Nederland, CO (US); Thomas J. Rose, Erie, CO (US); Randy J. Rose, Broomfield, CO (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 18/100,472

(22) Filed: Jan. 23, 2023

(51) Int. Cl.
*H02S 20/30* (2014.01)
*H02S 30/20* (2014.01)

(52) U.S. Cl.
CPC .............. *H02S 20/30* (2014.12); *H02S 30/20* (2014.12)

(58) Field of Classification Search
CPC ................................. H02S 20/30; H02S 30/20
See application file for complete search history.

(56) References Cited

U.S. PATENT DOCUMENTS

2022/0321057 A1\* 10/2022 Mazor ...................... B64G 1/44

\* cited by examiner

*Primary Examiner* — Jayne L Mershon
(74) *Attorney, Agent, or Firm* — Livingston Law Firm

(57) ABSTRACT

A passively deployable solar panel array. A truss backing is attached to the back of the solar panels, and has top segments, bottom segments, and hinge linkages that form a series of moveable parallelograms operable to fold and unfold. The truss backing further has springs and trusses, with at least one spring and one truss associated with each of the parallelograms. The springs are operable to deploy the solar panels from a folded position to a deployed position. Each truss is operable to become in tension diagonally across its associated parallelogram once the solar panels are deployed into a final position.

13 Claims, 11 Drawing Sheets

US 11,799,414 B1

PASSIVELY DEPLOYABLE SOLAR PANEL ARRAY WITH TRUSS BACKING

TECHNICAL FIELD OF THE INVENTION

This patent application relates to solar panels, and more particularly to deployable solar panel arrays.

BACKGROUND OF THE INVENTION

In space or for other applications where human operators are not readily available, systems that are self-deployable are often desired. For example, self-deployable solar panel systems are often used to power space equipment such as satellites. These solar panel systems are stowed as folded solar panel modules during travel into space and deployed once the satellite or other equipment is in space.

Fully actuated and controlled (non passive) deployments typically use motors, which add more power and mechanism risks to the deployment. Often with solar array systems that require high reliability, the inherent indeterminacy of a passively deployed system leads to heightened risk posture, which can drive requirements for a controlled deployment using additional motors. These add weight, complexity, and overall cost to the program.

On the other hand, some solar panel systems are referred to as "passively" deployed systems because although deployment (unfolding) of the solar panels may be initiated actively it is then completed passively. For stowage, the solar panels are folded or otherwise compacted for transport into space. At a desired time, such as on-orbit, one or more actuators are used to initiate deployment so that the solar panels are arranged to provide an array optimized for receiving sunlight.

A significant portion of stowed mass and volume is occupied by support systems for the solar array. In addition to actuator(s), the solar panels must have some means for connecting them together and for providing some degree of stiffness when deployed. For most passively deployed solar panel applications, it is desirable for this mass and volume to be as minimal as possible.

Many solar array systems that rely on passive deployment have a mechanically indeterminate deployment, which can lead to heightened risk of over-swing and potential impact with a satellite or other associated equipment.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a passively deployed solar array, particularly useful for space operations. The solar array is low cost and can be used for operations as high as multi-kilowatt class.

Figure 1:
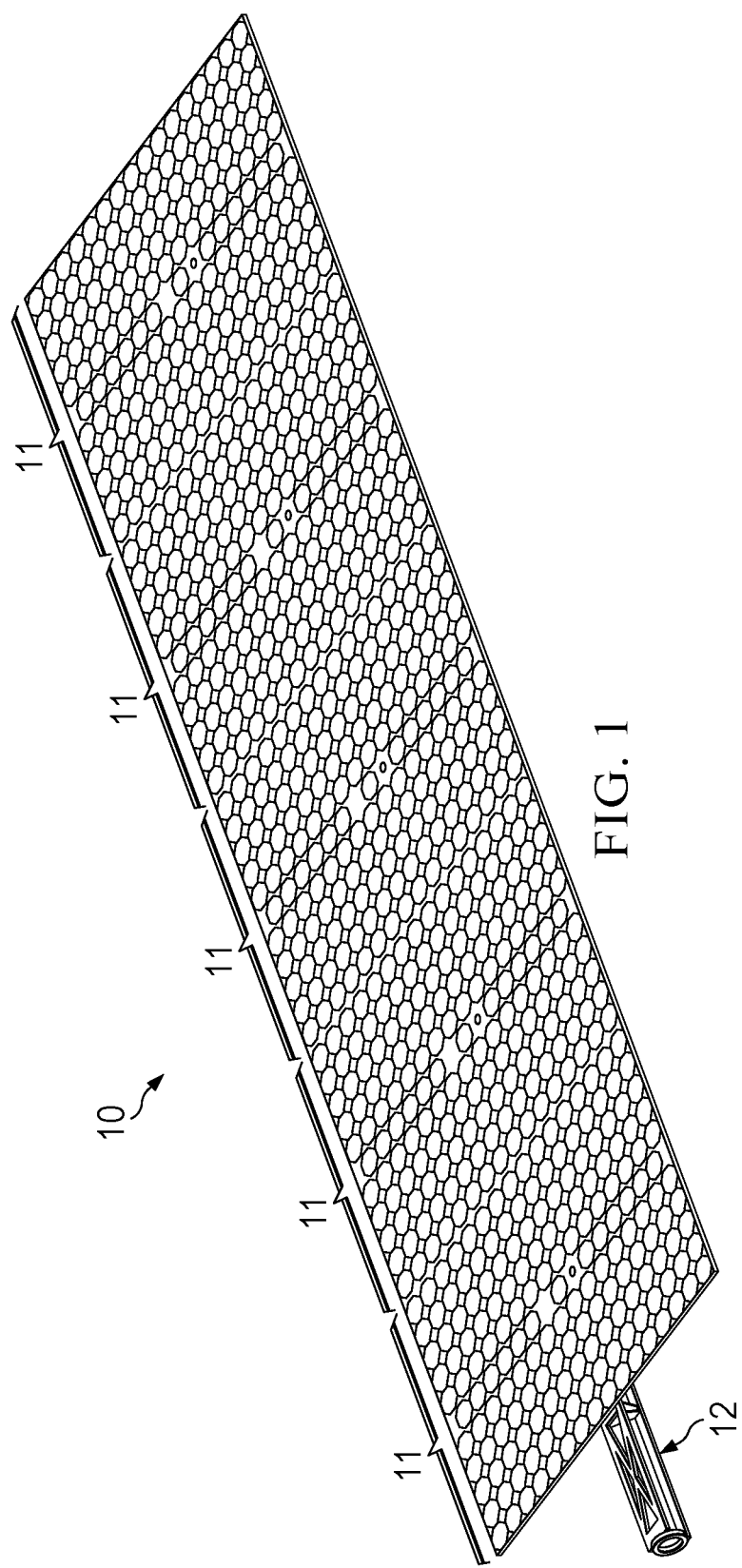
FIG. 1 is a top view of the solar panel system in a deployed state.

FIG. 1 is a top view of a truss-backed solar panel array 10 in accordance with the invention. By "top view" is meant that the top (solar receiving) side of the solar panels 11 is shown. In FIG. 1, array 10 is in its deployed (unfolded) position.

The equipment with which solar array 10 is used is not shown. An example of such equipment is a satellite. In order to fit a satellite in a launcher, its solar panels 11 are folded together and stowed against the satellite. Once the launcher has reached the desired orbit, the satellite is released and the solar panels are opened ("deployed").

Deployment of solar panel array 10 occurs such that the solar panels 11 go from a stowed state to their operational (deployed) state. For the invention described herein deployment is "synchronized" in the sense that the entire set of solar panels 11 deploys simultaneously, rather than in a sequence of actuations.

In the example of FIG. 1, solar array 10 has five solar panels 11, but more or fewer could be used. Sizing of solar array 10 is typically driven by environment and mission requirements for power supplied to the satellite or other space equipment.

In this embodiment, solar panels 11 are generally rectangular in shape but could be other shapes. When solar panel array 10 is deployed, solar panels 11 form a longer rectangular series of panels, with each solar panel 11 abutting a next solar panel 11.

A truss backing 12 provides a means for attaching solar panels 11 to each other as well as for deploying array 10. Truss backing 12 also provides a desired stiffness to the array 10 once deployed. Only an end portion of truss backing 12 is shown in FIG. 1; its various elements are described in detail below.

In operation, solar panel array 10 provides solar power for some sort of solar powered equipment such as the satellite described above. For example, solar array 10 may be used to provide power on-board sensors or other equipment of a satellite or other spacecraft. Electrical connections from solar panel array 10 to the solar powered equipment may be conventionally achieved and are not shown.

Figure 2:
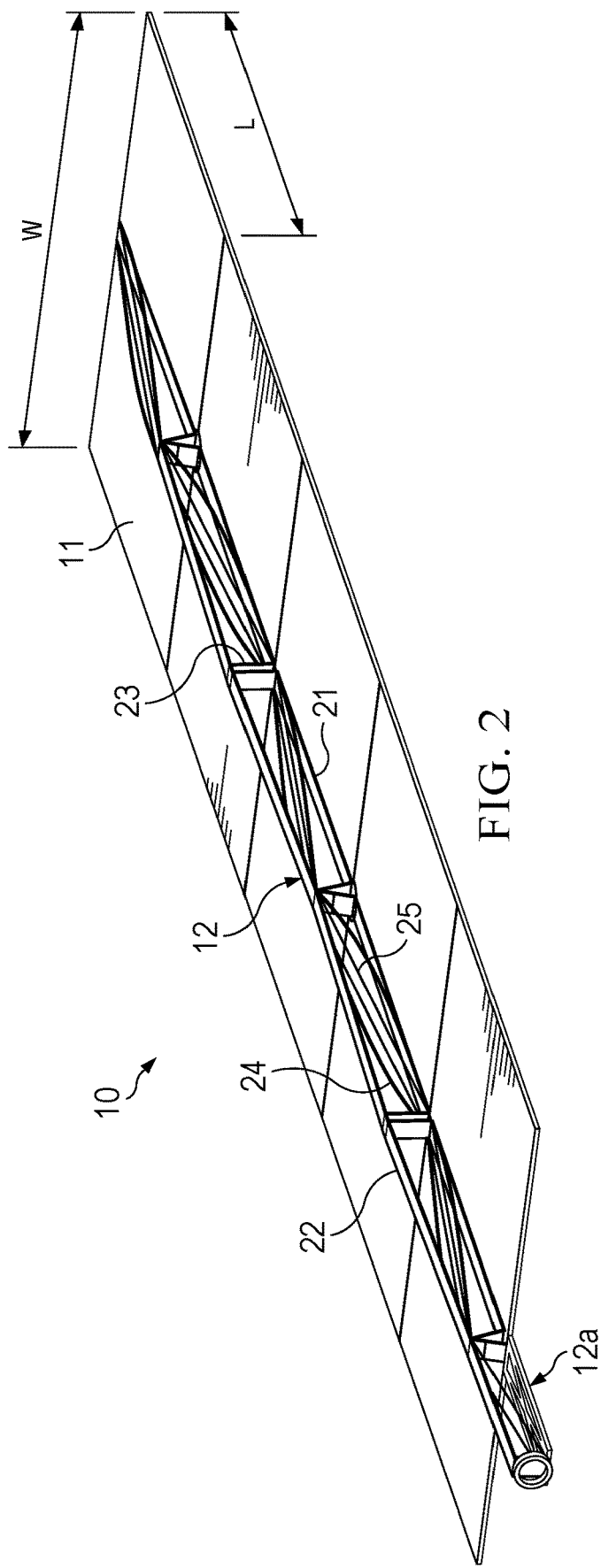
FIG. 2 is a bottom view of the solar panel system in a deployed state.

FIG. 2 is a bottom view of solar panel array 10 in a deployed state. As further explained below, after deployment, truss backing 12 is a trussed structure comprising pairs of bottom segments 21 and top segments 22 with hinge linkages 23 between them, and associated springs 24 and diagonal trusses 25. When the array is deployed as in FIG. 2, truss backing 12 runs the length of the solar panel array.

Bottom segments 21 are attached to the underside of the solar panels 11. In other embodiments, bottom segments 21 may be integral to the bottom of the solar panels rather than being attached. Top segments 22 are spaced away from the solar panels and from the bottom segments 21 by hinge linkages 23.

Solar panels 11 each have a width dimension (W) and a length dimension (L). They are typically the same size. Each bottom segment 21 is attached lengthwise down the bottom side of each solar panel 11. Here, the bottom segments 21 are attached lengthwise down the middle. In the embodiment of FIG. 2, the first solar panel (in order of deployment) has a bottom segment 21 but no top segment 22, but this need not necessarily be the case.

Truss backing 12 may include an interface section 12a, which does not carry a solar panel. Its purpose is to connect the rest of truss backing 12 to the equipment to which the solar array 10 is attached.

For simplicity of illustration in FIG. 2, each pair of top and bottom segments is shown with one each of a spring 24 and truss 25. In this deployed state, springs 24 have assisted in deployment as further explained below, by providing a constant spring force. Trusses 25 have been placed into tension, giving truss backing 12 its trussed support. The structure and operation of springs 24 and trusses 25 are further explained below in connection with FIGS. 4-10.

Figure 3:
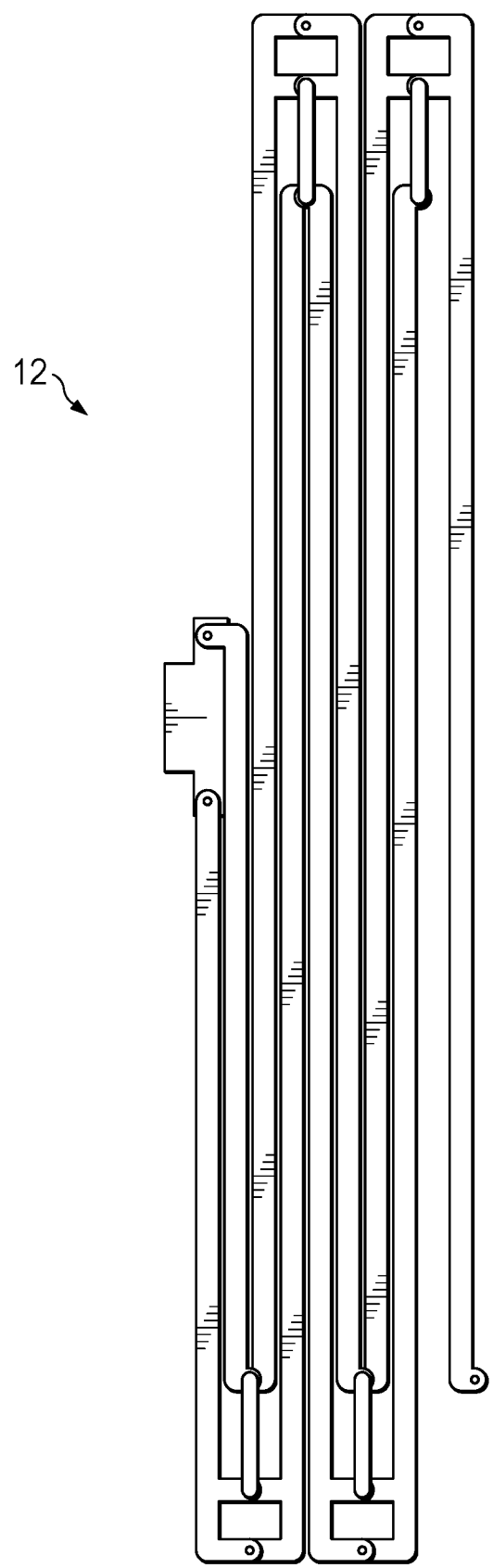
FIG. 3 is a side view of the truss backing in a folded (undeployed) state.

FIG. 3 is a side view of truss backing 12 in a folded (undeployed) state. For clarity of illustration, truss backing 12 is illustrated without solar panels 11 being explicitly illustrated, but in practice, the attachment of solar panels 11 will result in the same configuration and operation. As illustrated, for stowage, hinge linkages 23 allow solar panel array 10 to be folded in a manner that allows solar panels to "stack" vertically resulting in a compact package.

Figure 4:
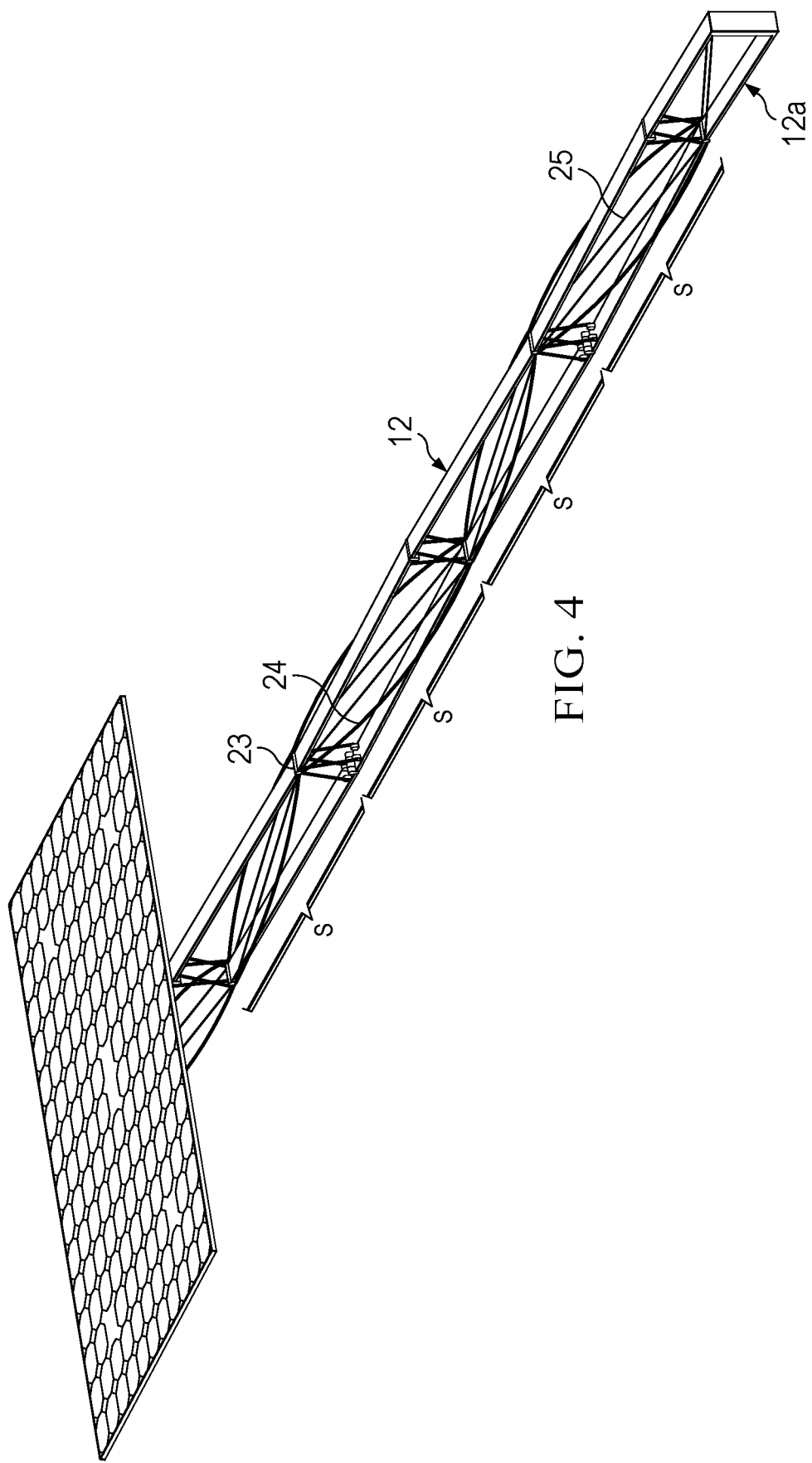
FIG. 4 is a perspective view of the truss backing in a deployed state, with only the tip solar panel explicitly shown.

FIG. 4 is a perspective view of truss backing 12 in a deployed state. For simplicity of illustration only the end (tip) solar panel 11 is shown.

Truss backing 12 can be described as having a number of repeating sections, S. In this embodiment, there is a one to one association of one section to one solar panel.

Each section, S, has a bottom segment 21, a top segment 22, two springs 24, and two diagonal trusses 25. Hinge linkages 23 connect these sections. The hinge linkages 23, springs 24, and truss diagonals 25 are mirrored left to right. In other embodiments, one or more of these components could be reduced to single components. There is not necessarily a one-to-one relationship between the number of springs and the number of trusses.

Geometrically, between hinge linkages 23, pairs of top and bottom sections form a series of parallelograms. As described below, as solar panel array 10 deploys, hinge linkages 23 allow the interior geometry of each parallelogram to "unfold", that is, to open and become less flat and more rectangular.

In the embodiment of FIG. 4, each section has two springs 24 and two diagonal trusses 25, with one spring and truss on one side and the other spring and truss on the other side. On each side, a spring 24 and a truss 25 are attached to a corner of a bottom segment 21 and to the opposing corner of a top segment 25. In other words, springs 24 and trusses 25 run diagonally across the parallelograms. In other embodiments, trusses 25 are always diagonal in this manner. Springs 24 may be otherwise arranged so long as they are functional to open the truss backing as described herein.

In FIG. 4, diagonal trusses 25 have become in a tensioned state, having been tensioned by the opposing force of springs 24 during deployment. The deployment process is described below.

Figure 5:
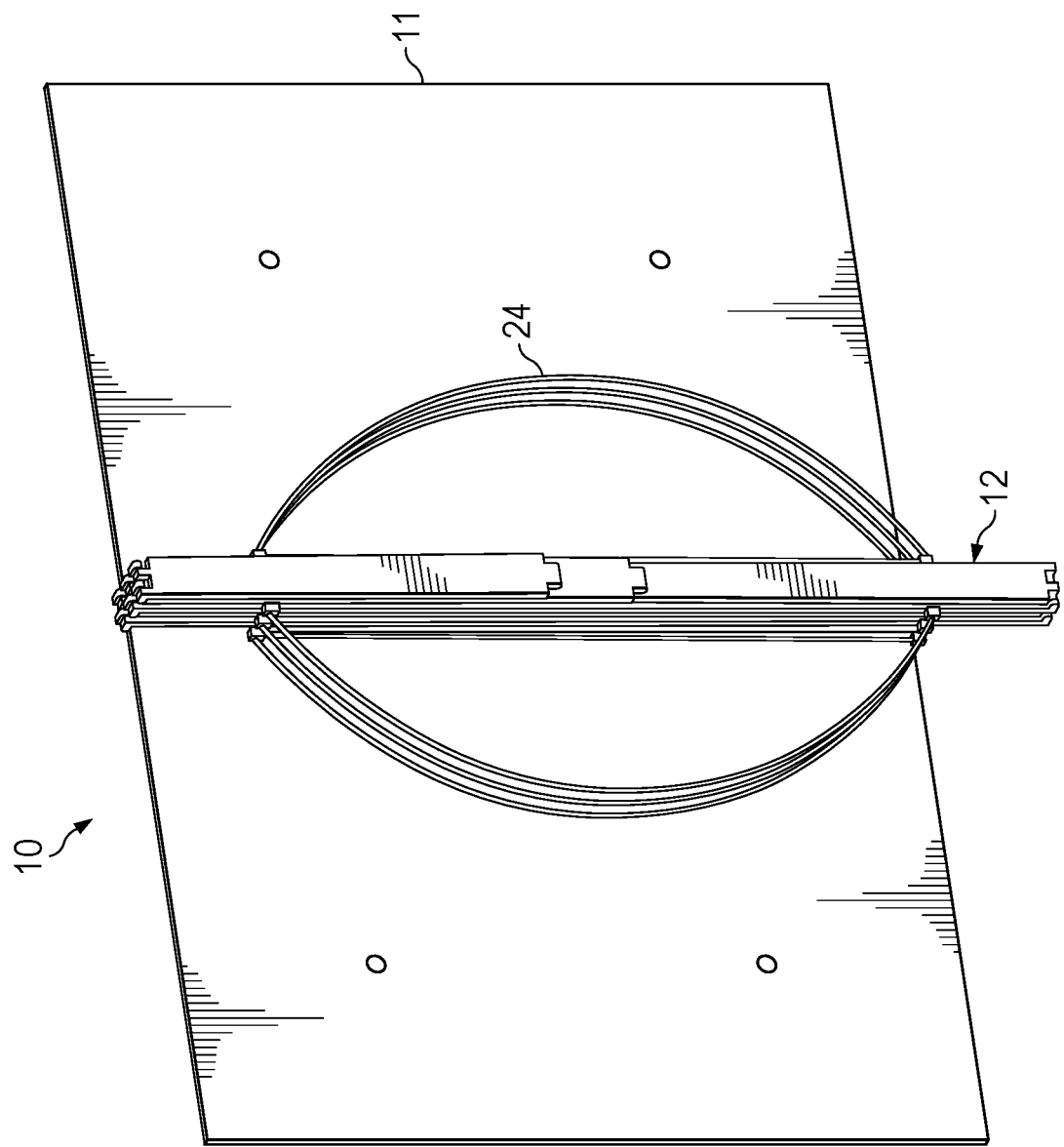
FIG. 5 illustrates the bottom of the tip solar panel and truss backing in an undeployed state.

FIG. 5 illustrates the bottom of the tip solar panel 11 and truss backing 12 in an undeployed state. Again, for simplicity, only tip solar panel 11 is illustrated, but in practice, the attachment of the other solar panels 11 will result in the same operation as herein described. Springs 24 are implemented as "buckled battens", e.g. narrow strips of a thin flexible material. The battens are buckled (pre-loaded), such that when released, they will push axially against each peak fold's bottom hinge and each valley fold's top hinge.

Other possible implementations for springs 24 are torsion springs, torsion rods, or compression springs. Various passive mechanisms that apply a constant spring force during deployment may be used. Also, various damper mechanisms may be desirable to control deployment. A single damper at the interface may be sufficient.

Trusses 25 are not shown in FIG. 5 but are in a slack (untensioned) state. Trusses 25 may be implemented with flexible strips, cables, wires, cords, or rods, or other flexible elongated material capable of being tensioned from a slack state in response to the forces of springs 24 during deployment. This tension is applied diagonally across the parallelograms formed by the top and bottom sections and linkages. A flexible strip or carbon cord, such as a batten shorter than the spring batten, that is stiff axially would be advantageous.

Figure 6:
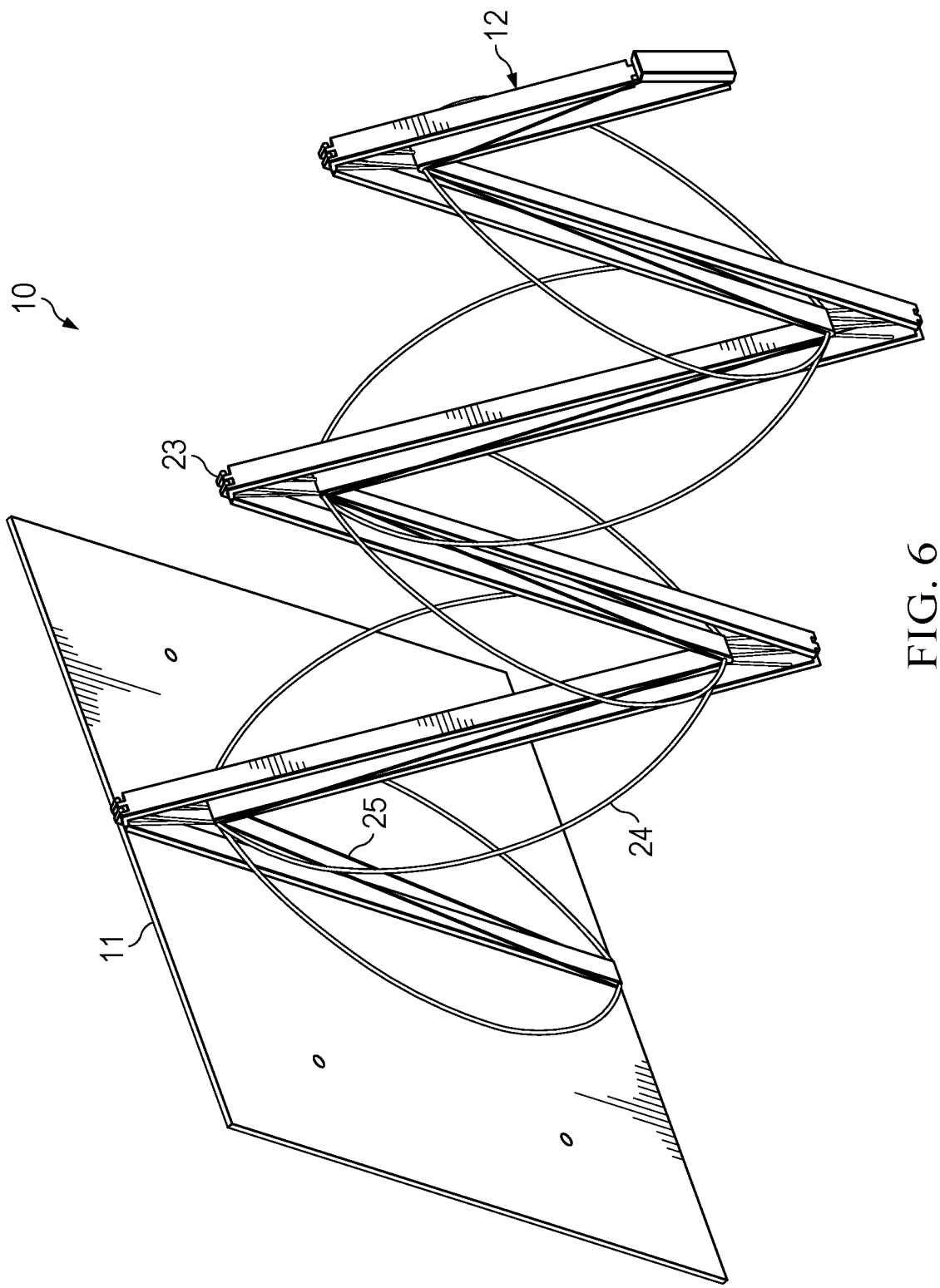
FIG. 6 illustrates the truss backing in mid-deployment, with only the tip solar panel explicitly shown.

FIG. 6 illustrates truss backing 12 in mid-deployment. Again, only the tip solar panel 11 is explicitly shown. Solar panels 11 are attached to truss backing 12 as illustrated in FIG. 2, with solar panels 11 arranged so that they abut each other in their deployed state (FIGS. 1 and 2) and may be folded accordion-like in their undeployed state (FIGS. 3 and 4).

Hinge linkages 23 allow this folding and unfolding of truss backing 12. Various hinge configurations and mechanisms may be used with the common feature being that hinge linkages 23 are operable to allow truss backing 12 (with solar panels attached) to fold and unfold as described herein. Hinge linkages 23 allow the parallelograms (formed by the top and bottom segments and linkages) to change shape from their closed folded shape to a more open rectangular shape as the truss backing deploys.

Of particular interest in FIG. 6 is the operation of springs 24 and trusses 25. Springs 24 have been released and are pushing the truss backing 12 out and away from its point of attachment to the equipment (satellite or other) with which it is used. In this state, the diagonal trusses 25 still are slack. Hinge linkages 23 keep the solar panels parallel and their angles matching throughout deployment.

Figure 7:
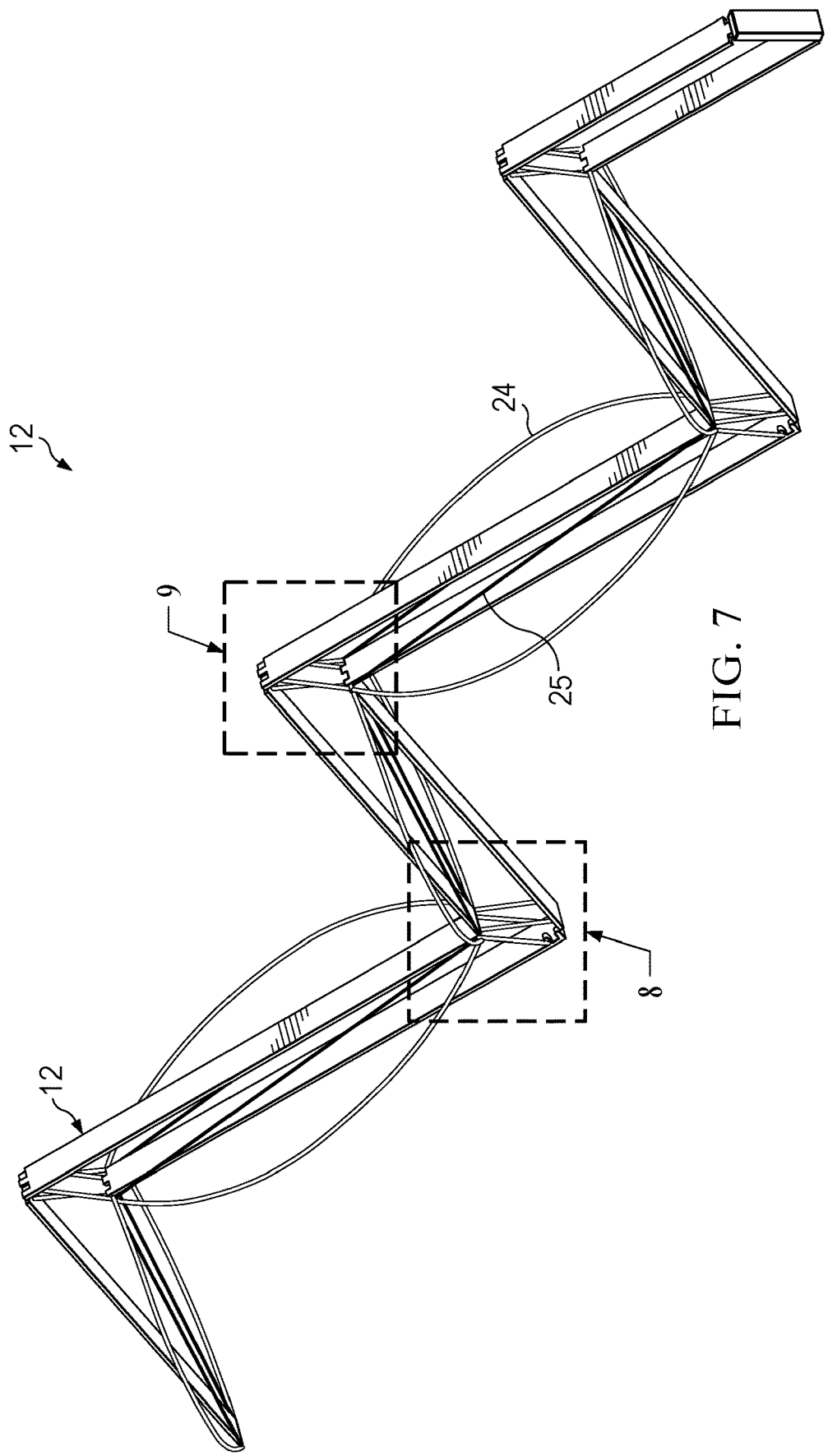
FIG. 7 is a second view during deployment of the truss backing, at a time subsequent to FIG. 6.

FIG. 7 is another view of mid-deployment of the solar panel array, showing only truss backing 12 for simplicity, during deployment at a time subsequent to FIG. 6. At this stage of deployment, the springs (battens) 24 continue their deployment force. The truss diagonals 25 are still slack. Linkages 23 continue to keep solar panels 11 in line and to keep deployment synchronized.

Figure 8:
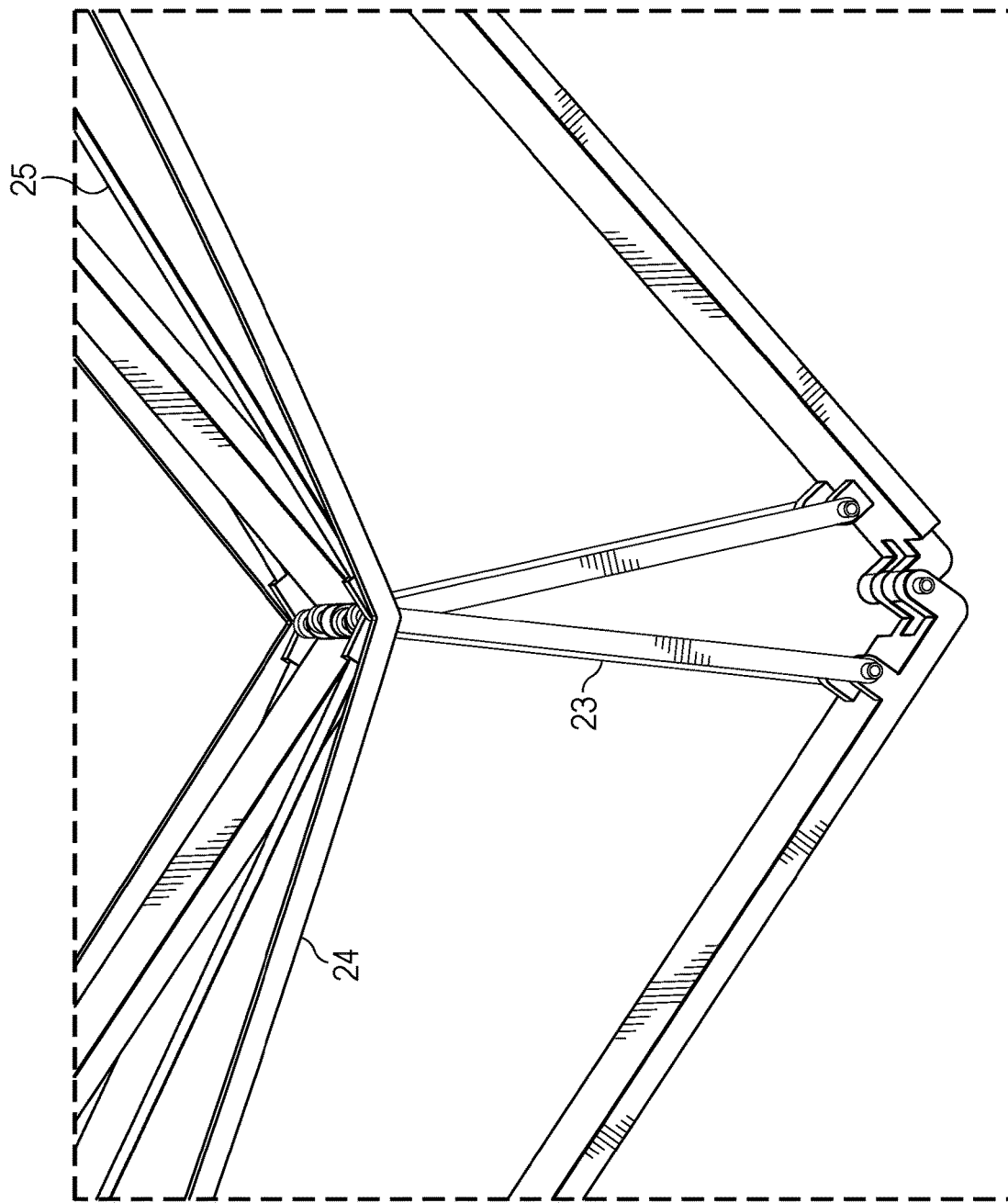
FIGS. 8 and 9 are detailed views of the valleys (FIG. 8) and peaks (FIG. 9) of FIG. 7.
Figure 9:
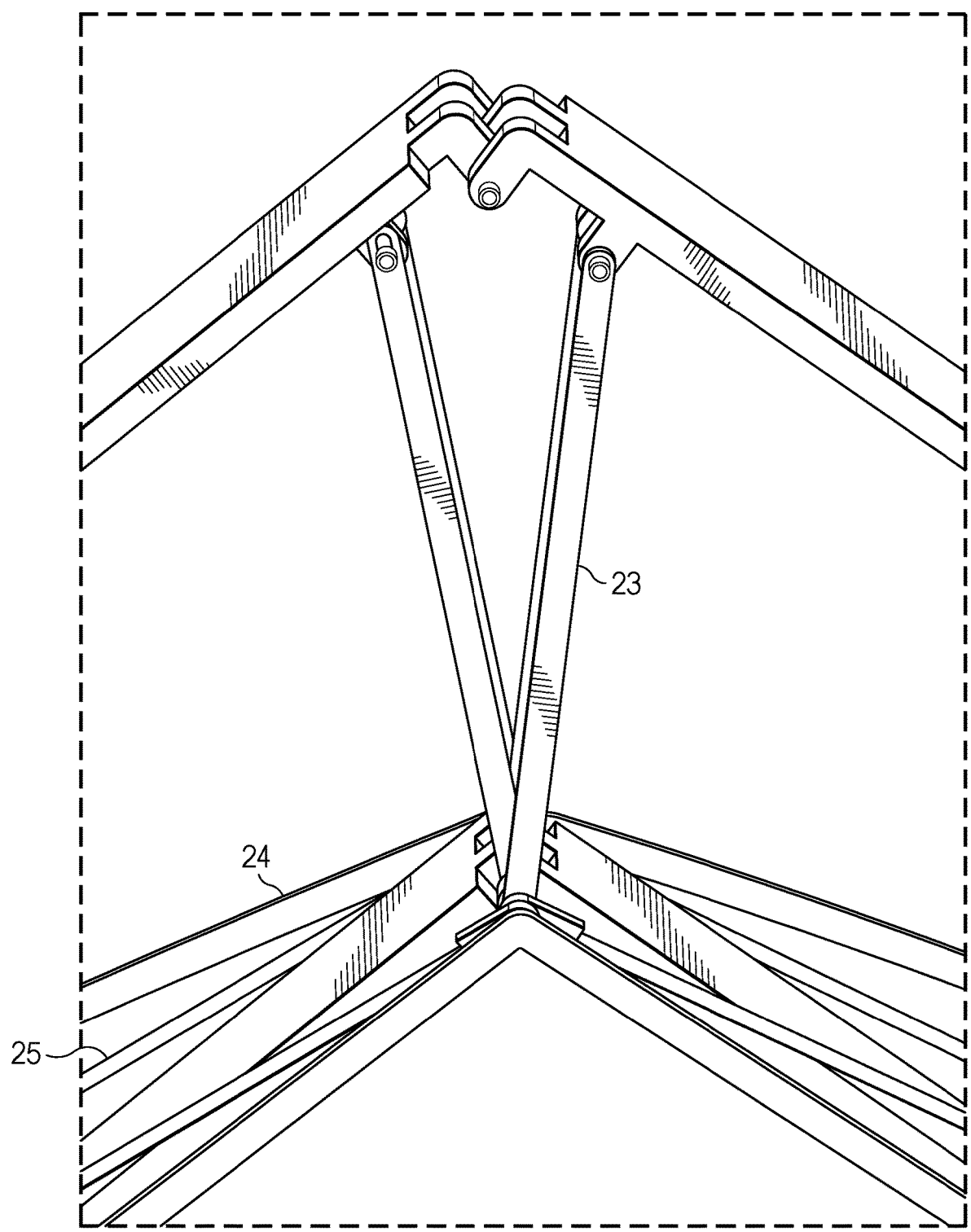

FIGS. 8 and 9 are detailed views of the valleys (FIG. 8) and peaks (FIG. 9) of FIG. 7.

Figure 10:
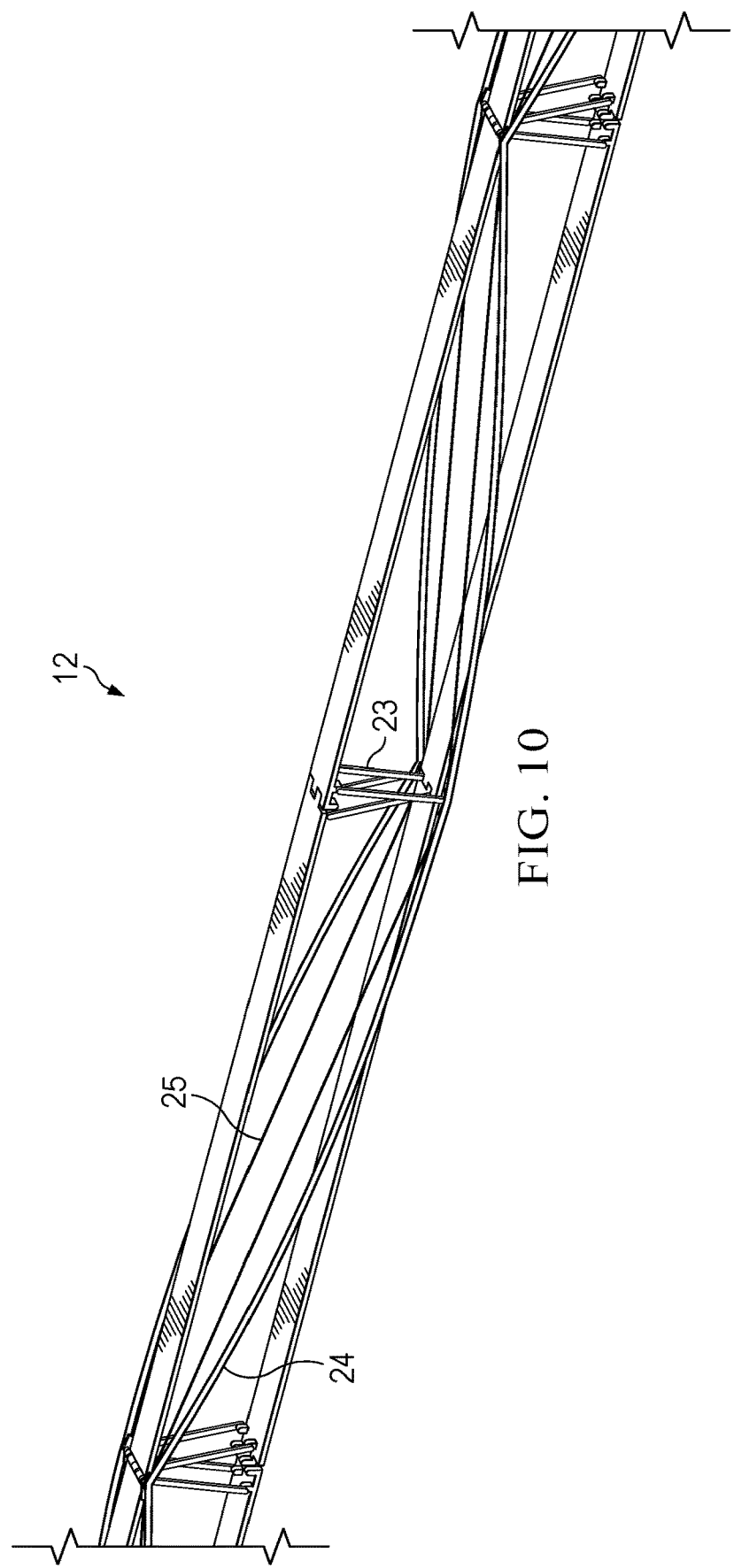
FIG. 10 illustrates a portion of the truss backing in full deployment.

FIG. 10 illustrates a portion of the truss backing 12 in full deployment. Springs 24 continue applying force to each section of truss backing. Diagonal trusses 25 have become tensioned as a result of the forces of the springs 24. Slop in linkages 23 allows for diagonal trusses 25 to control the end position of each solar panel (not shown) and create the tensioned truss backing 12.

In the example of FIGS. 7-10, linkages 23 are hinges with their closed end alternating between segments of the truss backing.

Hinge linkages 23 are "active" only during deployment, in the sense that their operational role is finished once solar array is deployed. As stated above, during deployment, hinge linkages 23 provide uniform deployment of the solar panels, but once deployed they are structurally invisible.

Figure 11:
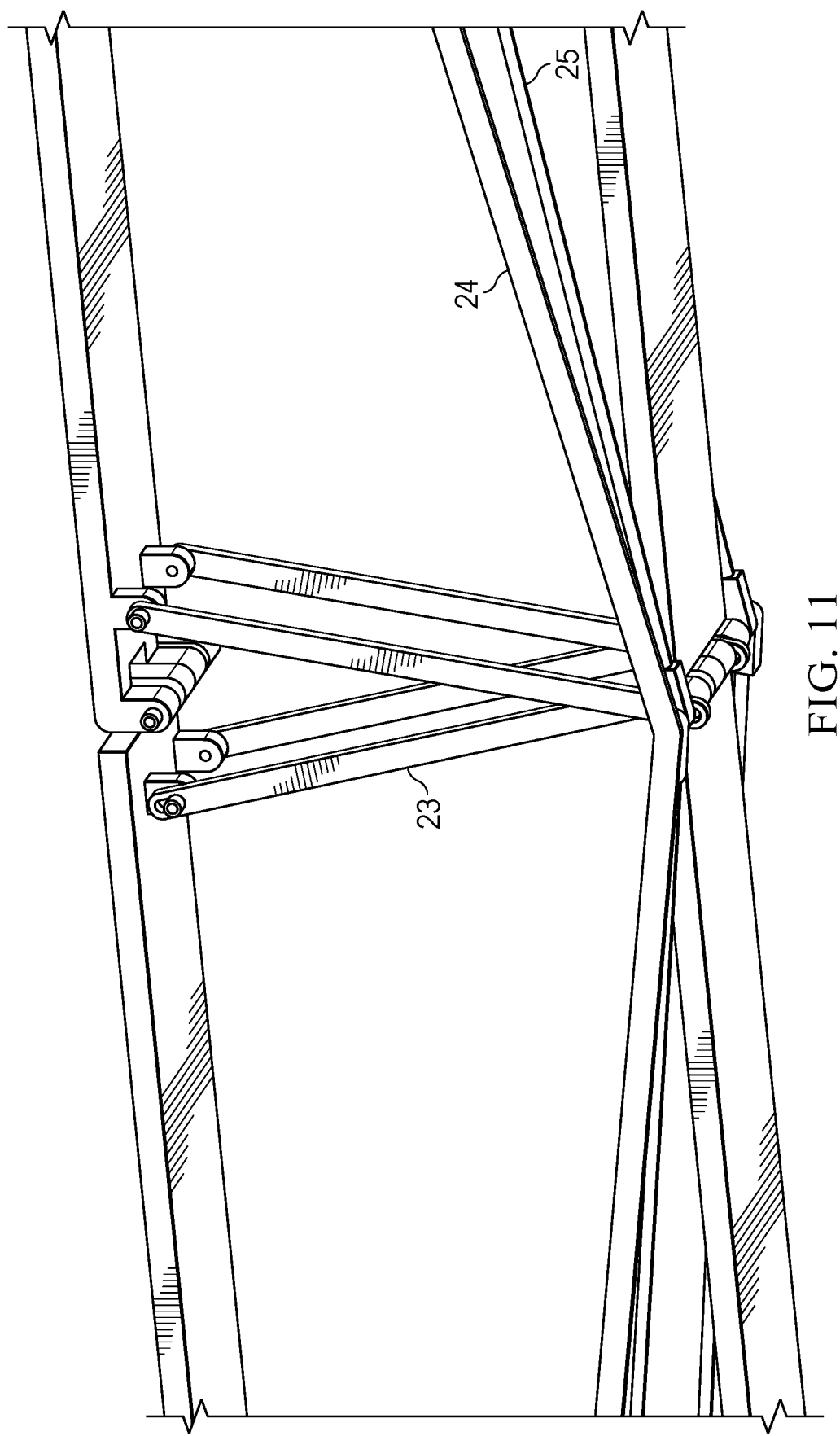
FIG. 11 illustrates one example of a hinge linkage.

FIG. 11 illustrates one example of a hinge linkage 23 in further detail. Here, truss backing 12 is in a deployed state and truss diagonals are tensioned as described above in connection with FIG. 10.

In sum, truss backing 12 is a passive stiffening system with a simple assembly and development case. Without truss backing, a solar array of the desired size would be within the excitation range of a typical ACS (attitude control system), which results in higher risk of loss in control and resonance in the system during maneuvering operations.

Truss backing 12 allows for a mechanically deterministic passively deployed solar array. It provides a stiffer and more mass efficient structure as compared to other beam-type backings. Multiple solar panels may be folded and stowed. Deployment is internally synchronized regardless of how many sections are used for the truss backing. The backing is easily scalable in size, geometry, quantity of solar panels, root attachment, and deployment force.

What is claimed is:

1. A passively deployable array of solar panels, comprising:
    a truss backing for attachment to the solar panels, the truss backing having at least:
    a series of bottom segments;
    a series of top segments;
    linkages operable to attach the bottom segments to the top segments such that pairs of bottom segments and top segments form a series of moveable parallelograms operable to fold and unfold;
    a set of solar panels, each solar panel having a top side and a bottom side, the top side operable to receive sunlight;
    and wherein a bottom segment is attached to or integral to the bottom side of each solar panel, such that the truss backing runs axially along bottom sides of the solar panels;
    the truss backing further having springs and trusses, with at least one spring and one truss associated with each of the pairs of bottom segments and top segments;
    wherein the springs are operable to deploy the solar panels from a folded position to a deployed position; and
    wherein each truss is operable to become in tension diagonally across its associated parallelogram by the action of the springs when the solar panels are deployed into a final position.

2. The solar panel array of claim 1, wherein the springs are battens that may be placed in a loaded state by being buckled.

3. The solar panel array of claim 1, wherein the springs are torsion springs, torsion rods, or compression springs.

4. The solar panel array of claim 1, wherein the trusses are implemented with flexible wire, cable, cord, or rod.

5. The solar panel array of claim 1, wherein each of the pairs of bottom segments and top segments have a first side and a second side and at least one spring and one truss on each side.

6. The solar panel array of claim 1, wherein each linkage comprises a two-piece hinge.

7. The solar panel array of claim 1, wherein each linkage comprises a two-piece hinge, with a closed end whose location alternates between pairs of top segments and bottom segments.

8. A method of deploying an array of solar panels, comprising:
    attaching a truss backing to bottom sides of the solar panels, the truss backing having at least:
    a series of bottom segments;
    a series of top segments;
    linkages operable to attach the bottom segments to the top segments such that pairs of bottom segments and top segments form a series of moveable parallelograms operable to fold and unfold;
    wherein a bottom segment is attached to or integral to the bottom side of each solar panel, such that the truss backing runs axially along the bottom sides of the solar panels;
    the truss backing further having springs and trusses, with at least one spring and one truss associated with each of the pairs of bottom segments and top segments;
    actuating the truss backing such that the springs are operable to deploy the solar panels from a folded position to a deployed position, and such that each truss is operable to become in tension diagonally across its associated parallelogram by the action of the springs when the solar panels are deployed into a final position.

9. The method of claim 8, further comprising dampening the actuating step.

10. The method of claim 8, wherein the springs are battens that may be placed in a loaded state by being buckled.

11. The method of claim 8, wherein the springs are torsion springs, torsion rods, or compression springs.

12. The method of claim 8, wherein the trusses are implemented with flexible wire, cable, cord, or rod.

13. The method of claim 8, wherein each of the pairs of bottom segments and top segments have a first side and a second side and at least one spring and one truss on each side.

* * * * *